US012770881B2

(12) United States Patent
Noh et al.

(10) Patent No.: US 12,770,881 B2
(45) Date of Patent: Oct. 20, 2026

(54) ELECTRODE FOR SECONDARY BATTERY AND METHOD FOR MANUFACTURING THE SAME

(71) Applicant: LG Energy Solution, Ltd., Seoul (KR)

(72) Inventors: Suk In Noh, Daejeon (KR); Sangwook Woo, Daejeon (KR); Changju Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 740 days.

(21) Appl. No.: 17/773,180

(22) PCT Filed: Aug. 27, 2021

(86) PCT No.: PCT/KR2021/011548

§ 371 (c)(1),
(2) Date: Apr. 29, 2022

(87) PCT Pub. No.: WO2022/050640

PCT Pub. Date: Mar. 10, 2022

(65) Prior Publication Data

US 2022/0376259 A1 Nov. 24, 2022

(30) Foreign Application Priority Data

Sep. 7, 2020 (KR) ........................ 10-2020-0113648
Aug. 20, 2021 (KR) ........................ 10-2021-0110158

(51) Int. Cl.

| | |
|---|---|
| ***H01M 4/62*** | (2006.01) |
| ***H01M 4/04*** | (2006.01) |
| ***H01M 4/131*** | (2010.01) |
| ***H01M 4/133*** | (2010.01) |
| ***H01M 4/1391*** | (2010.01) |
| ***H01M 4/1393*** | (2010.01) |
| ***H01M 4/64*** | (2006.01) |
| ***H01M 10/0525*** | (2010.01) |
| *H01M 4/02* | (2006.01) |

(52) U.S. Cl.

CPC ......... *H01M 4/622* (2013.01); *H01M 4/0404* (2013.01); *H01M 4/131* (2013.01); *H01M 4/133* (2013.01); *H01M 4/1391* (2013.01); *H01M 4/1393* (2013.01); *H01M 4/625* (2013.01); *H01M 4/64* (2013.01); *H01M 10/0525* (2013.01); *H01M 2004/027* (2013.01)

(58) Field of Classification Search

CPC .... H01M 4/622; H01M 4/0404; H01M 4/625; H01M 2004/027; H01M 4/64; H01M 4/587; H01M 4/386; H01M 4/485; H01M 4/131; H01M 4/133; H01M 4/1393; H01M 10/0525; H01M 4/364; H01M 4/1391

See application file for complete search history.

(56) References Cited

U.S. PATENT DOCUMENTS

| | | | | |
|---|---|---|---|---|
| 2004/0077733 | A1 | 4/2004 | Bowers et al. | |
| 2006/0257738 | A1 | 11/2006 | Kim et al. | |
| 2010/0009257 | A1 | 1/2010 | Kang et al. | |
| 2012/0187347 | A1 | 7/2012 | Eilertsen et al. | |
| 2013/0143119 | A1* | 6/2013 | Mah ...................... | H01M 4/386 429/231.95 |
| 2014/0212694 | A1* | 7/2014 | Park ...................... | H01M 4/386 429/219 |
| 2016/0028087 | A1 | 1/2016 | Sonobe | |
| 2016/0118663 | A1 | 4/2016 | Maruhashi | |
| 2020/0119355 | A1 | 4/2020 | Cho et al. | |

FOREIGN PATENT DOCUMENTS

| | | | |
|---|---|---|---|
| CA | 2916160 | A | * 12/2014 |
| CN | 1768439 | A | 5/2006 |
| CN | 102057455 | A | 5/2011 |
| CN | 104733728 | | * 6/2015 |
| CN | 109786810 | A | 5/2019 |
| CN | 106784857 | B | 4/2020 |
| JP | 2014007120 | A | 1/2014 |
| JP | 2017142917 | A | 8/2017 |
| KR | 20040087656 | A | 10/2004 |
| KR | 20060095368 | A | 8/2006 |
| KR | 20070079979 | A | 8/2007 |
| KR | 2015-0124928 | A | 11/2015 |
| KR | 20150131014 | A | 11/2015 |
| KR | 101680466 | B1 | 11/2016 |
| KR | 20180133749 | A | 12/2018 |
| KR | 102152982 | B1 | 9/2020 |
| TW | 201836974 | A | 10/2018 |
| WO | 2014192238 | A1 | 12/2014 |
| WO | 2018038957 | A1 | 3/2018 |
| WO | WO 2018/037867 | | * 3/2018 |
| WO | 2019082587 | A1 | 5/2019 |

OTHER PUBLICATIONS

Extended European Search Report for Application No. 21864600.8 dated Jul. 3, 2023. 7 pgs.

(Continued)

*Primary Examiner* — Laura Weiner

(74) *Attorney, Agent, or Firm* — Lerner David LLP

(57) ABSTRACT

An electrode for a secondary battery is disclosed herein. In some embodiments, an electrode for a secondary battery includes an electrode current collector; and an active material layer disposed on the electrode current collector, wherein the active material layer is prepared by coating an electrode slurry onto the electrode current collector, wherein the electrode slurry is an aqueous solution containing an anode active material, a conductive material, a surfactant and a binder is coated onto the electrode current collector, and wherein the binder comprises a water-soluble polymer.

12 Claims, 2 Drawing Sheets

(56) References Cited

OTHER PUBLICATIONS

Search Report dated Jun. 26, 2023 from Office Action for Chinese Application No. 2021800066257 issued Jun. 29, 2023. 2 pgs. (see p. 1, categorizing the cited references).
International Search Report for Application No. PCT/KR2021/011548 dated Dec. 6, 2021, 2 pages.

* cited by examiner

【FIG. 1A】
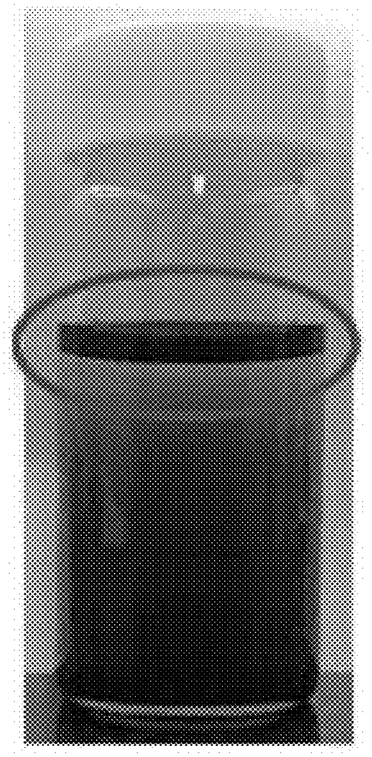
【FIG. 1B】
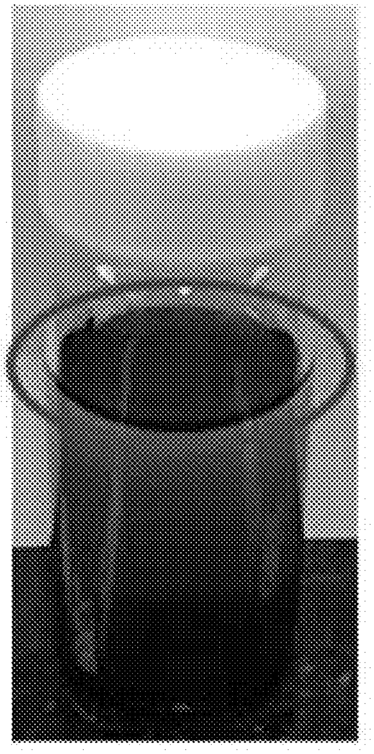

【FIG. 2A】
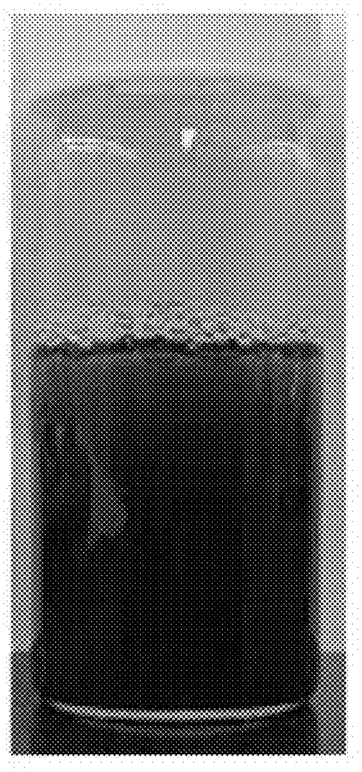
【FIG. 2B】
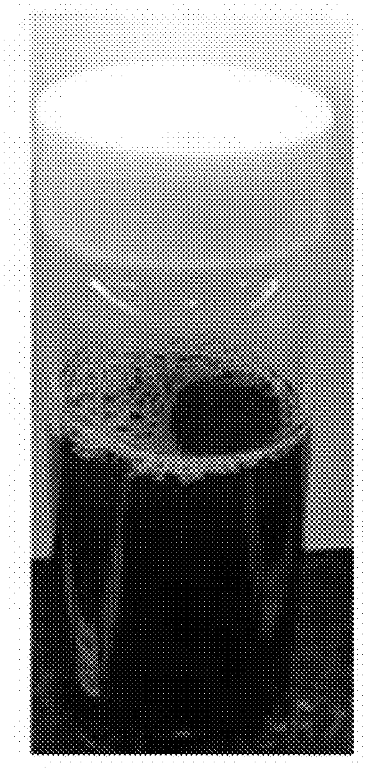

ELECTRODE FOR SECONDARY BATTERY AND METHOD FOR MANUFACTURING THE SAME

CROSS-REFERENCE TO RELATED APPLICATION(S)

This application is a national phase entry under 35 U.S.C. § 371 of International Application No. PCT/KR2021/011548, filed on Aug. 27, 2021, which claims priority from Korean Patent Application No. 10-2020-0113648, filed on Sep. 7, 2020, and Korean Patent Application No. 10-2021-0110158, filed on Aug. 20, 2021, the disclosures of which are incorporated by reference herein.

TECHNICAL FIELD

The present disclosure relates to an electrode for a secondary battery and a method for manufacturing the electrode for a secondary battery, and more particularly, to an electrode for a secondary battery having improved dispersibility and viscosity, and a method for manufacturing the electrode for a secondary battery.

BACKGROUND

With the technology development and increased demand for mobile devices, demand for secondary batteries as energy sources has been rapidly increasing. Among these secondary batteries, a lithium secondary battery having high energy density and a high voltage, a long cycle lifespan, and a low self-discharge rate is commercially available and widely used.

In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

In addition, with the growing interest in environmental issues, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is being actively conducted, and some of them are in the stage of commercialization.

In manufacturing the anode among the conventional secondary battery electrodes, the electrode slurry applied onto an electrode current collector was divided into organic-based and water-based. At this time, in terms of cost, such as manufacturing cost and management cost, a water-based electrode slurry is more advantageous than an organic-based electrode slurry, and thus a conventional anode for a secondary battery has been manufactured using a water-based electrode slurry.

Further, generally, graphite, which is an anode active material contained in an anode for a secondary battery, is a material that is not dispersed in water. Therefore, the conventional anode for a secondary battery includes carboxymethyl cellulose (CMC) in the water-based electrode slurry, thereby securing the dispersibility of graphite and the viscosity of the electrode slurry.

However, carboxymethyl cellulose has a relatively low solubility in water. Therefore, there is a limit in that it is difficult to increase the content of the anode active material that can be contained in the water-based electrode slurry. Further, carboxymethyl cellulose has low solubility in water and thus, may generate an undissolved substance or an insoluble substance (micro-gel). As a result, there is a problem that gelation phenomenon, electrode surface defect, clogging of the filter in the line, and the like occur, and thus the electrode quality is deteriorated.

In addition to this, considering the low solubility of carboxymethyl cellulose in water, in the case of a conventional water-based electrode slurry, it is necessary to further perform a separate high viscosity mixing (kneading) in order to improve the dispersibility of graphite. Here, the high viscosity mixing (kneading) applies a uniform shear force to the solid content in the high-viscosity dough, thereby improving the dispersibility of the solid content. However, there is a limit to improving the dispersibility of the solid content only by the high viscosity mixing (kneading), and when a shear force is not sufficiently applied in the high viscosity mixing, there is a problem in that dispersibility and phase stability of the electrode slurry are deteriorated.

Further, the solid content is inevitably reduced at the point where the viscosity of the electrode slurry is determined by the solvent added after the high viscosity mixing (kneading), and there is a problem that the process efficiency is reduced and the complexity of the process is increased.

Therefore, there is a need to develop an electrode including a water-based electrode slurry that can overcome the limitation of carboxymethylcellulose, and a method for manufacturing the electrode. In particular, there is a growing need to develop an electrode including a water-based electrode slurry having a high solid content while improving the dispersibility and viscosity of the solid content contained in the electrode slurry.

DETAILED DESCRIPTION OF THE INVENTION

Technical Problem

It is an object of the present disclosure to provide an electrode for a secondary battery having improved dispersibility and viscosity, and a method for manufacturing the electrode for a secondary battery.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided an electrode for a secondary battery comprising: an electrode current collector; and an active material layer positioned on the electrode current collector, wherein the active material layer is formed such that an electrode slurry prepared from an aqueous solution containing an anode active material, a conductive material, a surfactant and a binder is coated onto the electrode current collector, and wherein the binder comprises a water-soluble polymer.

The electrode slurry may have a solid content of 50% by weight to 90% by weight based on the total weight of the electrode slurry.

The electrode slurry may have a viscosity of 1000 cps to 50000 cps.

The surfactant may be contained in an amount of 0.01% by weight to 10% by weight based on the total weight of the electrode slurry.

The surfactant may include at least one of t-octylphenoxypolyethoxyethanol, octylphenoxypolyethoxyethanol, and polysorbate 20.

The binder may have a viscosity of 3000 cps to 50000 cps.

The binder may include at least one of polyvinylpyrrolidone, polyimide, polyacrylonitrile, and polyamide.

The anode active material may include graphite, a silicon oxide-based material ($SiO_x$), or a mixture thereof.

The conductive material may include a carbon-based material, CNT (carbon nanotube), graphene, or a mixture thereof.

According to another embodiment of the present disclosure, there is provided a secondary battery comprising the above-mentioned electrode for a secondary battery.

According to yet another embodiment of the present disclosure, there is provided a method for manufacturing an electrode for a secondary battery comprising the steps of: mixing an anode active material and a conductive material with an aqueous surfactant solution to prepare a first solution; mixing a binder with the first solution to prepare an electrode slurry; and applying and coating the electrode slurry onto the electrode current collector, wherein the binder may include a water-soluble polymer.

The electrode slurry may have a solid content of 50% by weight to 90% by weight based on the total weight of the electrode slurry.

The electrode slurry may have a viscosity of 1000 cps to 50000 cps.

The surfactant may be contained in an amount of 0.01% by weight to 10% by weight based on the total weight of the electrode slurry.

The binder may have a viscosity of 3000 cps to 50000 cps.

Advantageous Effects

According to embodiments of the present disclosure, an electrode for a secondary battery formed such that an electrode slurry including a surfactant and a binder containing a water-soluble polymer is coated onto an electrode current collector, and a method for manufacturing the electrode for a secondary battery is provided and thereby, the dispersibility of the active material in the electrode slurry can be improved, and the viscosity of the electrode slurry can be improved.

The effects of the present disclosure are not limited to the effects mentioned above and additional other effects not described above will be clearly understood from the description and the appended claims by those skilled in the art.

BRIEF DESCRIPTION OF THE DRAWINGS

FIGS. 1A and 1B are enlarged images at different viewing angles of a dispersion according to a comparative example; and FIGS. 2A and 2B are enlarged images at different viewing angles of a dispersion according to an embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Now, an electrode for a secondary battery and a manufacturing method thereof according to one embodiment of the present disclosure will be described below.

An electrode for a secondary battery according to one embodiment of the present disclosure includes an electrode current collector; and an active material layer positioned on the electrode current collector, wherein the active material layer is formed such that an electrode slurry prepared from an aqueous solution containing an anode active material, a conductive material, a surfactant and a binder is coated onto the electrode current collector, and wherein the binder includes a water-soluble polymer.

Further, the electrode slurry may have a solid content of 30% by weight to 90% by weight based on the total weight of the electrode slurry. More preferably, the electrode slurry may have a solid content of 30% by weight to 80% by weight based on the total weight of the electrode slurry. As an example, the electrode slurry may have a solid content of 50% by weight to 90% by weight based on the total weight of the electrode slurry.

When the content of the solids contained in the electrode slurry satisfies the above-mentioned range, the electrode slurry can contain a sufficient amount of the anode active material, which may be advantageous in terms of electrode quality, manufacturing cost, and process control. When the electrode slurry has a solid content of less than 30% by weight, the electrode slurry contains a relatively small amount of the anode active material and thus, the battery performance is deteriorated, which may be disadvantageous in terms of time and cost according to the manufacturing process. In addition, when the electrode slurry has a solid content of more than 90% by weight, the electrode slurry has no fluidity, and so coating onto the current collector is impossible, and the phase stability of the electrode slurry is very unstable, dispersion of the solid content in the electrode slurry is difficult, and the quality of the electrode such as a surface defect of the electrode may be deteriorated.

Further, the electrode slurry may have a viscosity of 1000 cps to 50000 cps. More preferably, the electrode slurry may have a viscosity of 3000 cps to 30000 cps. In one example, the electrode slurry may have a viscosity of 4000 cps to 20000 cps.

When the viscosity of the electrode slurry satisfies the above-mentioned range, the sedimentation of the solid content contained in the electrode slurry can be suppressed, and the dispersed state of the active material may be equally maintained for a long period of time. When the viscosity of the electrode slurry is less than 1000 cps, the sedimentation of the solid content in the electrode slurry is difficult to be suppressed, and thus the dispersed state of the active material may not be equally maintained for a long period of time. Further, when the viscosity of the electrode slurry is more than 50000 cps, it may be difficult to perform stirring of the electrode slurry, and thus the degree of dispersion of the solid content may be greatly reduced.

Hereinbelow, the respective components included in the electrode for a secondary battery according to an embodiment of the present disclosure will be described in detail.

The active material may be an anode active material. The anode active material may be an anode active material for a lithium secondary battery commonly used in the art. As an example, a material such as lithium metal, lithium alloy, petroleum coke, activated carbon, graphite, silicon, tin, metal oxide or other carbons can be used. More preferably, the anode active material may be graphite, a silicon oxide-based material ($SiO_x$), or a mixture thereof.

More specifically, most of the anode active material may be hydrophobic, and the anode active material may have low reactivity with water. Therefore, in the electrode for a secondary battery according to the present embodiment, even if the electrode slurry includes an aqueous solvent base such as distilled water (Di water) as a solvent together with the anode active material, the reaction between the anode active material and the solvent may not occur and thus, the capacity of the electrode can be easily realized, and the resistance can be small.

However, a general cathode active material is a metal oxide-based material including lithium (Li) and is highly reactive with water in that it is hydrophilic. Therefore, when an aqueous solvent base such as distilled water (Di water) as a solvent together with the cathode active material is included as the electrode slurry, a reaction between the cathode active material and water can often occur, and so it is difficult to realize the capacity of the electrode, and there are technical limitations such as the resistance becoming very large accordingly. Further, there is a problem that it is very difficult to manage moisture in the process in consideration of the reactivity between the cathode active material and water.

Therefore, in the case of a water-based electrode slurry using an aqueous solvent base such as Di water as a solvent, similar to the electrode for a secondary battery according to the present embodiment, the active material may be preferably an anode active material.

The anode active material may be contained in an amount of 40% by weight to 80% by weight based on the total weight of the electrode slurry. More preferably, the anode active material may be contained in an amount of 45% by weight to 70% by weight based on the total weight of the electrode slurry. As an example, the anode active material may be contained in an amount of 50% by weight to 65% by weight based on the total weight of the electrode slurry.

When the content of the anode active material contained in the electrode slurry satisfies the above-mentioned range, the electrode slurry can contain a sufficient amount of the anode active material, which can be advantageous in terms of electrode quality, manufacturing cost and process control. When the electrode slurry contains less than 40% by weight of the anode active material, the electrode slurry contains a relatively small amount of the anode active material and thus, the battery performance may be deteriorated, which may be disadvantageous in terms of time and cost according to the manufacturing process. Further, when the electrode slurry contains more than 80% by weight of the anode active material, there may exist an anode active material that is not dispersed in the electrode slurry, and the electrode quality such as surface defects of the electrode can be lowered.

The surfactant may be a nonionic surfactant. In one example, the surfactant may include t-octylphenoxypolyethoxyethanol (Triton X-100), octylphenoxypolyethoxyethanol (Nonidet P40 or IGEPAL CA-630), polysorbate (20) sorbitan monolaurate (Tween20) and the like, and one alone or a mixture of two or more of them may be used. However, the surfactant is not limited to the above-mentioned materials, and any surfactant capable of dispersing the anode active material in an aqueous solvent base such as distilled water may be included in the surfactant of the present disclosure.

The surfactant can perform the role of a dispersant in the electrode slurry. In particular, the surfactant may disperse the anode active material contained in the electrode slurry. More specifically, from the viewpoint that most of the anode active material is hydrophobic, the surfactant can enhance the dispersibility of the anode active material in an aqueous solvent base such as distilled water (Di water) as a solvent.

Accordingly, unlike the conventional water-based electrode slurry, in the case of the present embodiment, the anode active material is easily dispersed in a solvent by the surfactant, and thus the solid content of the electrode slurry can be more increased. In addition, in the case of the present embodiment, a separate high viscosity mixing (kneading) for the purpose of improving the dispersibility of graphite may not be additionally performed, which is advantageous in that the process efficiency is increased and the process can also be simplified.

The surfactant may be contained in an amount of 0.01% by weight to 10% by weight based on the total weight of the electrode slurry. More preferably, it may be contained in an amount of 0.01% by weight to 5% by weight based on the total weight of the electrode slurry. In one example, it may be contained in an amount of 0.1% by weight to 1% by weight based on the total weight of the electrode slurry.

When the content of the surfactant satisfies the above-mentioned range, the dispersibility of the active material contained in the electrode slurry can be improved, and the content of the active material that can be contained in the electrode slurry can also be increased. When the content of the surfactant is less than 0.01% by weight, it is difficult to disperse a sufficient amount of the active material and the conductive material in the electrode slurry, and the quality of the electrode slurry may be deteriorated. Further, when the content of the surfactant is more than 10% by weight, there is a problem that bubbles due to the surfactant are excessively generated, the electrode slurry is difficult to handle, and the surfactant causes a side reaction with an electrolytic solution, thereby deteriorating the battery performance.

The conductive material is used to impart conductivity to the electrode, and the conductive material can be used without particular limitation as long as it has electronic conductivity without causing chemical changes in the battery to be configured. Specific examples thereof include carbon-based materials such as carbon black, acetylene black, ketjen black, channel black, furnace black, lamp black, thermal black, carbon graphene and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative, and any one alone or a mixture of two or more of them may be used. More preferably, the conductive material may be a carbon-based material, CNT (carbon nanotube), graphene, or a mixture thereof.

The conductive material may be included in an amount of 0.01% by weight to 20% by weight based on the total weight of the electrode slurry.

The binder performs the role of improving adhesion between anode active material particles and an adhesive force between the anode active material and the current collector. In addition, the binder has a high viscosity, and serves to improve the viscosity of the electrode slurry.

In one example, the binder may generally include polyvinylidene fluoride (PVDF), a vinylidene fluoride-co-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, polytetrafluoroethylene, polyethylene, polypropylene, an ethylene-propylene-diene monomer (EPDM), a sulfonated EPDM, styrene butadiene rubber (SBR), fluoro rubber, or various copolymers thereof, and one alone or a mixture of two or more of them may be used.

More preferably, the binder may include a water-soluble polymer. The binder containing a water-soluble polymer may include polyvinyl acetate (PVA), polyacrylic acid (PAA), polyacrylic acid ester, polyethylene vinyl acetate, styrene acrylic acid ester resin, styrene butadiene resin (SBR), polyvinyl alcohol (PVA), carboxymethyl cellulose (CMC), starch, cellulose resin, alginate, polyurethane, polyethylene oxide (PEO), polyvinyl pyrrolidone (PVP), polyimide (PI), polyacrylonitrile (PAN), polyamide (PA), and the like, and one alone or a mixture of two or more of them may be used.

As the binder according to the present embodiment, except for carboxymethylcellulose (CMC) and styrene butadiene resin (SBR) among the water-soluble polymers listed above, polyvinyl acetate (PVA), polyacrylic acid (PAA), polyacrylic acid ester, polyethylene vinyl acetate, styrene acrylic acid ester resin, polyvinyl alcohol (PVA), starch, cellulose resin, alginate, polyurethane, polyethylene oxide (PEO), polyvinyl Pyrrolidone (PVP), polyimide (PI), polyacrylonitrile (PAN), polyamide (PA) or various copolymers thereof, and the like can be used, and one alone or a mixture of two or more of them can be used.

The binder may be contained in an amount of 1% by weight to 30% by weight based on the total weight of the electrode slurry. More preferably, the binder may be contained in an amount of 1% by weight to 20% by weight based on the total weight of the electrode slurry. In one example, the binder may be contained in an amount of 1% by weight to 10% by weight based on the total weight of the electrode slurry.

Further, the binder may have a viscosity of 3000 cps to 50000 cps. More preferably, the binder may have a viscosity of 4000 cps to 50000 cps. In one example, the binder may have a viscosity of 5000 cps to 50000 cps.

When the viscosity of the binder satisfies the above-mentioned range, the binder can sufficiently secure the adhesion and viscosity of the electrode slurry. When the viscosity of the binder is less than 3000 cps, it may be difficult to ensure the viscosity of the electrode slurry as intended, which may make it difficult to equally maintain the dispersion state of the active material for a long period of time. Further, when the viscosity of the binder is more than 50000 cps, it may be difficult to perform stirring of the binder, and the degree of dispersion of the solid content may be greatly reduced.

The secondary battery according to another embodiment of the present disclosure may include the anode for the secondary battery. More specifically, the secondary battery may include an electrode assembly including the anode for a secondary battery, a cathode, and a separator interposed between the anode for a secondary battery and the cathode, and an electrolyte.

The cathode may be manufactured by applying a cathode slurry including a cathode active material, a binder, a conductive material, and the like onto a cathode current collector, similarly to the anode for a secondary battery.

Further, the cathode can be manufactured in a form in which a cathode slurry including a cathode active material is applied onto a cathode current collector, and the cathode slurry can further include the conductive material and binder as described above together with the cathode active material.

The cathode active material may include, for example, a layered compound such as lithium cobalt oxide ($LiCoO_2$), lithium nickel oxide ($LiNiO_2$), or a compound substituted with one or more transition metals; lithium manganese oxides such as chemical formulae $Li_{1+x}Mn_{2-x}O_4$ (where x is 0 or more and 0.33 or less), $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; a Ni-site type lithium nickel oxide represented by chemical formula $LiNi_{1-x}M_xO_2$ (where M is Co, Mn, Al, Cu, Fe, Mg, B or Ga, and x is 0.01 or more and 0.3 or less); lithium manganese composite oxide represented by chemical formulae $LiMn_{2-x}M_xO_2$ (where M is Co, Ni, Fe, Cr, Zn or Ta, and x is 0.01 or more and 0.1 or less) or $Li_2Mn_3MO_8$ (where M is Fe, Co, Ni, Cu or Zn); lithium manganese composite oxide having a spinel structure represented by $LiNi_xMn_{2-x}O_4$; $LiMn_2O_4$ in which a part of Li in the chemical formula is substituted with an alkaline earth metal ion; a disulfide compound; $Fe_2(MoO_4)_3$, and the like, but are not limited thereto.

The cathode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, and the like can be used. In addition, the cathode current collector may have a thickness of 3 μm to 500 μm, and can have fine irregularities formed on the surface of the current collector, thereby increasing the adhesive force of the cathode active material. For example, it may be used in various forms such as films, sheets, foils, nets, porous bodies, foams, and nonwoven fabrics.

The separator separates an anode and a cathode, and provides a passage for lithium ions to migrate. Any separator can be used without particular limitation as long as it is generally used as a separator in a lithium secondary battery. In particular, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof can be used. Further, a conventional porous nonwoven fabric, for example, a nonwoven fabric made of high melting point glass fiber, polyethylene terephthalate fiber, or the like can be used. Further, in order to secure heat resistance or mechanical strength, a coated separator containing a ceramic component or a polymer material can be used, and optionally, a single layer or a multilayer structure can be used.

In addition, the electrolyte solution used in the present disclosure may include an organic liquid electrolyte, an inorganic liquid electrolyte, a solid polymer electrolyte, a gel type polymer electrolyte, a solid inorganic electrolyte, a molten inorganic electrolyte or the like which can be used in the production of a lithium secondary battery, but is not limited thereto.

Specifically, the electrolyte solution may include an organic solvent and a lithium salt.

As the organic solvent, any solvent can be used without particular limitation as long as it can serve as a medium through which ions involved in the electrochemical reaction of the battery can migrate. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; nitriles such as R—CN (where R is a straight, branched or cyclic C2-C20 hydrocarbon group, and may include a double-bond aromatic ring or ether bond); amides such as dimethylformamide; dioxolanes such as 1,3-dioxolane; or sulfolanes can be used. Among them, the carbonate-based solvent is preferable, and a mixture of a cyclic carbonate (e.g., ethylene carbonate, propylene carbonate, etc.) having high ionic conductivity and a high-dielectric constant, which may increase charge/discharge performance of the battery, and a low-viscosity linear carbonate-based compound (e.g., ethyl methyl carbonate, dimethyl carbonate, diethyl carbonate, etc.) may be more preferably used. In this case, when the cyclic carbonate and the chain carbonate are mixed and used in a volume ratio of about 1:1 to about 1:9, the performance of the electrolyte can exhibit excellently.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like can be used as the lithium salt. It is preferable to use the lithium salt in a concentration rage of 0.1 M to 2.0 M. If the concentration of the lithium salt is included within the above range, the electrolyte has an appropriate conductivity and viscosity and thus, excellent electrolyte performance can be exhibited, and lithium ions can effectively migrate.

In order to improve the lifespan characteristics of the battery, suppress a reduction in battery capacity and improve discharge capacity of the battery, the electrolyte solution may further include, for example, one or more additives such as a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride, in addition to the above electrolyte components. In this case, the additive may be included in an amount of 0.1% by weight to 5% by weight based on the total weight of the electrolyte solution.

The method for manufacturing an electrode for a secondary battery according to another embodiment of the present disclosure includes the steps of: mixing an anode active material and a conductive material with an aqueous surfactant solution to prepare a first solution; mixing a binder with the first solution to prepare an electrode slurry; and applying and coating the electrode slurry onto the electrode current collector.

Thereby, the method for manufacturing the electrode for a secondary battery according to the present embodiment does not require an additional high viscosity mixing (kneading) in order to improve the dispersibility of graphite, as in a conventional carboxymethyl cellulose, and thus, there is an advantage in that the efficiency of the process is increased and the process is simplified.

Further, as in the electrode for a secondary battery described above, even in the case of the manufacturing method according to the present embodiment, the binder may include a water-soluble polymer. In addition, the electrode slurry may have a solid content of 50% by weight to 90% by weight based on the total weight of the electrode slurry. Further, the electrode slurry may have a viscosity of 1000 cps to 50000 cps. In addition, the surfactant may be contained in an amount of 0.01% by weight to 10% by weight based on the total weight of the electrode slurry. Further, the binder may have a viscosity of 3000 cps to 50000 cps.

Thereby, the manufacturing method according to the present embodiment can produce an electrode containing an aqueous electrode slurry having a high solid content while improving the dispersibility and viscosity of the solid content contained in the electrode slurry.

Below, the contents of the present disclosure will be described by way of examples, but the following examples are for illustrative purposes only, and the scope of the present disclosure is not limited thereto.

Example 1

Example 1 is a dispersion in which 0.02 g of graphite and 0.001 wt. % to 0.01 wt. % of a surfactant (t-octylphenoxypolyethoxyethanol) are mixed with 10 mL of distilled water.

Comparative Example 1

Comparative Example 1 is a dispersion in which 0.02 g of graphite and 1 wt. % of carboxymethyl cellulose are mixed with 10 mL of distilled water.

Experimental Example 1 (Confirmation of Layer Separation)

FIGS. 1A and 1B are enlarged images at different viewing angles of a dispersion according to a comparative example. FIGS. 2A and 2B are enlarged images at different viewing angles of a dispersion according to an embodiment of the present disclosure.

Referring to FIGS. 1A and 1B, it can be confirmed that the dispersion according to Comparative Example 1 causes a phenomenon in which graphite is layer-separated in an aqueous solution. Through this, it can be confirmed that graphite has a property that does not disperse in water, but carboxymethyl cellulose of Comparative Example 1 does not sufficiently disperse graphite in water.

Therefore, carboxymethyl cellulose of Comparative Example 1 needs to be further subjected to a separate high viscosity mixing (kneading) in order to improve the dispersibility of graphite. That is, when the water-based electrode slurry contains carboxymethyl cellulose as in Comparative Example 1, the layer separation phenomenon is highly likely to occur as shown in FIGS. 1A and 1B, and there is a problem that the efficiency of the process is lowered and the complexity is increased in that a separate high viscosity mixing (kneading) should be additionally performed.

On the other hand, referring to FIGS. 2A and 2B, it can be confirmed that graphite according to Example 1 is uniformly dispersed without being layer-separated in an aqueous solution phase. Thereby, it can be confirmed that graphite has a property that does not disperse in water, but t-octylphenoxypolyethoxyethanol of Example 1 sufficiently disperses graphite in water. Therefore, t-octylphenoxypolyethoxyethanol of Example 1 does not require a separate high viscosity mixing unlike Comparative Example 1, and the possibility of occurrence of the layer separation phenomenon is low as shown in FIGS. 2A and 2B, which is advantageous in that the efficiency of the process is increased and simplified.

Example 2

Graphite and Super-C65 as a conductive material were added to an aqueous solution of t-octylphenoxypolyethoxyethanol and mixed. Polyvinylpyrrolidone was added to the mixed aqueous solution, and mixed again to prepare an electrode slurry. At this time, the overall mixing time was 40 minutes.

At this time, the content of graphite contained in the electrode slurry is 55.99 wt. %, the content of the conductive material is 1 wt. %, the content of t-octylphenoxypolyethoxyethanol is 0.01 wt. %, and the content of polyvinylpyrrolidone was 3 wt. %. At this time, the electrode slurry of Example 2 has a solid content of 60 wt. % based on the total weight.

Example 3

Unlike Example 2, the content of graphite contained in the electrode slurry is 55.95 wt. %, and the content of t-octylphenoxypolyethoxyethanol is 0.05 wt. %. Except these points, an electrode slurry was prepared in the same manner as in Example 2.

Example 4

Unlike Example 2, the content of graphite contained in the electrode slurry is 60.95 wt. % and the content of t-octylphenoxypolyethoxyethanol is 0.05 wt. %. At this time, the electrode slurry of Example 3 has a solid content of 65 wt. % based on the total weight. Except these points, an electrode slurry was prepared in the same manner as in Example 2.

Example 5

Unlike Example 2, the content of graphite contained in the electrode slurry is 60.9 wt. %, and the content of t-octylphenoxypolyethoxyethanol is 0.1 wt. %. At this time, the electrode slurry of Example 4 has a solid content of 65 wt. % based on the total weight. Except these points, an electrode slurry was prepared in the same manner as in Example 2.

Comparative Example 2

Super-C65 as a conductive material was dispersed in an aqueous solution of carboxymethyl cellulose (CMC), and graphite was added to the aqueous solution of carboxymethylcellulose in which the conductive material was dispersed, and subjected to high viscosity mixing (hard mixing). Carboxymethyl cellulose was additionally added to the aqueous solution subjected to high viscosity mixing, and then mixed. Styrene butadiene rubber (SBR) was added to the mixed aqueous solution, and then mixed again to prepare an electrode slurry. At this time, the overall mixing time was 80 minutes.

At this time, the content of graphite contained in the electrode slurry is 35 wt. %, the content of the conductive material is 1.0 wt. %, the content of carboxymethylcellulose is 1.0 wt. %, and the content of styrene butadiene rubber is 3.0 wt. %. At this time, the electrode slurry of Comparative Example 2 has a solid content of 40 wt. % based on the total weight.

Comparative Example 3

Unlike Comparative Example 2, the content of graphite contained in the electrode slurry is 42 wt. %. At this time, the electrode slurry of Comparative Example 2 has a solid content of 47 wt. % based on the total weight. Except these points, an electrode slurry was prepared in the same manner as in Example 2.

Comparative Example 4

Unlike Comparative Example 2, the content of graphite contained in the electrode slurry is 34.5 wt. %, and the content of carboxymethylcellulose is 1.5 wt. %. Except these points, an electrode slurry was prepared in the same manner as in Example 2.

Comparative Example 5

Unlike Comparative Example 2, the content of graphite contained in the electrode slurry is 39.5 wt. %, and the content of carboxymethylcellulose is 1.5 wt. %. At this time, the electrode slurry of Comparative Example 5 has a solid content of 45 wt. % based on the total weight. Except these points, an electrode slurry was prepared in the same manner as in Example 2.

Experimental Example 2 (Viscosity Measurement)

The viscosities of Examples 2 to 5 and Comparative Examples 2 to 5 were measured based on a B-type viscometer, and the results are shown in Table 1 below.

TABLE 1

| | B type viscosity (cps) | B type viscosity after 48 hr (cps) |
|---|---|---|
| Example 2 | 7,000 | 5,000 |
| Example 3 | 7,000 | 7,000 |
| Example 4 | 12,000 | 12,000 |
| Example 5 | 12,000 | 12,000 |
| Comparative Example 2 | 4,000 | 2,000 |
| Comparative Example 3 | 10,000 | 6,000 |
| Comparative Example 4 | 9,000 | 7,000 |
| Comparative Example 5 | 15,000 | 13,000 |

Referring to Table 1, it can be confirmed that in the case of Examples 2 to 5, the viscosity is similar to or relatively higher than Comparative Examples 2 to 5. It can be confirmed therefrom that the viscosity of polyvinylpyrrolidone contained in Examples 2 to 5 corresponds to 3000 cps to 50,000 cps, and thus, in addition to the role of a binder between anode active materials, it also plays the role of a thickener that improves the viscosity of the electrode slurry.

Unlike the same, it can be confirmed that in the case of Comparative Examples 2 to 5, some Comparative Examples have high viscosity, but both the type B viscosity of the electrode slurry decreases with the lapse of time. In addition, it can be confirmed that in Comparative Examples 2 to 5, the solid content of the electrode slurry is 40 wt. % to 47 wt. %, and therefore, even though the solid content is lower than that of Examples 2 to 5 (60 wt. % to 65 wt. %), the change in viscosity is shown to be large. It can be seen therefrom that as the solid content contained in the electrode slurries of Comparative Examples 2 to 5 is dispersed in a solvent of the electrode slurry, layer separation occurs.

Through this, it can be confirmed that carboxymethyl cellulose of Comparative Examples 2 to 5 does not sufficiently disperse graphite in water. More specifically, the viscosity of styrene butadiene rubber (SBR) included in Comparative Examples 2 to 5 corresponds to 500 to 1000 cps. Accordingly, it can be confirmed that carboxymethyl cellulose performs the role of a thickener in addition to the role of dispersant, but there is a limit to maintaining the viscosity due to the low solubility of carboxymethyl cellulose in water.

On the other hand, in the case of Examples 2 to 5, it can be confirmed that the viscosity of the type B of the electrode slurry is equally maintained in large part despite the passage of time. Through this, it can be confirmed that the electrode slurries of Examples 2 to 5 have high phase stability. In addition, it can be confirmed that in Examples 2 to 5, the content of the solids contained in the electrode slurry is 60 wt. % to 65 wt. %, and therefore, even though the solid content is higher than Comparative Examples 2 to 5 (40 wt. % to 47 wt. %), the viscosity change is mostly shown to be equal. It can be seen therefrom that Examples 2 to 5 have high phase stability of the electrode slurry while t-octylphenoxypolyethoxyethanol contained in the electrode slurry sufficiently disperses a relatively large amount of solid content, Experimental Example 3 (Coin Half Cell Test)

The electrode slurry prepared in each of Examples 2 to 5 and Comparative Examples 2 to 5 was coated onto a copper foil electrode current collector to prepare an anode.

Each anode prepared above as an operating electrode, and a Li metal thin film cut into a circle of 1.7671 $cm^2$ as a counter electrode were used, and a polyethylene separator was interposed between the operating electrode and the counter electrode to prepare an electrode assembly. Ethylene carbonate (EC) and ethyl methyl carbonate (EMC) were mixed in a volume ratio of 7:3. To the mixed solvent, 0.5 wt. % of vinylene carbonate (VC) and 1 M $LiPF_6$ were added as non-aqueous electrolyte additives to prepare a non-aqueous electrolyte solution. The electrode assembly was built in a coin-type case, and the prepared non-aqueous electrolyte solution was injected to manufacture a coin-type half-cell secondary battery.

In the state where each of the secondary batteries manufactured in this way had a discharge capacity of 350 mAh/g and an initial efficiency of 93%, the discharge resistance and the 2 C (rate) discharge cycle capacity retention were measured, respectively, and the results are shown in Table 2 below.

TABLE 2

| | Discharge resistance (ohm, 10 sec) | 2 C discharge cycle capacity retention (%, @100cycle) |
|---|---|---|
| Example 2 | 7.0 | 94 |
| Example 3 | 7.0 | 94 |
| Example 4 | 6.5 | 95 |
| Example 5 | 6.5 | 94 |
| Comparative Example 2 | 12.5 | 91 |
| Comparative Example 3 | 12.0 | 92 |
| Comparative Example 4 | 20.5 | 87 |
| Comparative Example 5 | 22.0 | 85 |

Referring to Table 2, it can be seen that in the case of Comparative Examples 2 to 5, the discharge resistance was measured as being relatively high, and 2 C discharge cycle capacity retention is measured as being relatively low.

It can be confirmed therefrom that as Comparative Examples 2 to 5 contain carboxymethyl cellulose, the solid content of the electrode slurry is relatively less dispersed, and therefore, Comparative Examples 2 to 5 are also relatively reduced in the amount of dispersion of the active material and the conductive material, which is unfavorable in the resistance and cycle characteristics.

On the other hand, it can be confirmed that as Examples 2 to 5 include t-octylphenoxypolyethoxyethanol, the solid content of the electrode slurry is relatively more dispersed, and thus in Examples 2 to 5, the amount of the active materials and conductive materials are relatively increased, and thus the discharge resistance and cycle characteristics are advantageous.

Although the invention has been shown and described with reference to the preferred embodiments, the scope of the present disclosure is not limited thereto, and various modifications and improvements made by those skilled in the art using the basic concepts of the present disclosure, which are defined in the appended claims, also falls within the spirit and scope of the present disclosure.

The invention claimed is:

1. A negative electrode for a secondary battery, comprising:

an electrode current collector; and an active material layer disposed on the electrode current collector, wherein the active material layer prepared by coating an electrode slurry onto the electrode current collector, wherein the electrode slurry is an aqueous solution containing an anode active material, a conductive material, a surfactant and a binder is coated onto the electrode current collector, wherein the binder comprises at least one of polyvinylpyrrolidone, polyimide, polyacrylonitrile, or polyamide, wherein the surfactant comprises at least one of t-octylphenoxypolyethoxyethanol, or octylphenoxypolyethoxyethanol, and wherein the electrode slurry has a solid content of 60% by weight to 90% by weight based on the total weight of the electrode slurry.

2. The negative electrode for a secondary battery according to claim 1, wherein:

the electrode slurry has a viscosity of 1000 cps to 50000 cps.

3. The negative electrode for a secondary battery according to claim 1, wherein:

the surfactant is contained in an amount of 0.01% by weight to 10% by weight based on the total weight of the electrode slurry.

4. The negative electrode for a secondary battery according to claim 3, wherein:

the surfactant is contained in an amount of 0.001% by weight to less than 0.01% by weight based on the total weight of the electrode slurry.

5. The negative electrode for a secondary battery according to claim 1, wherein:

the binder has a viscosity of 3000 cps to 50000 cps.

6. The negative electrode for a secondary battery according to claim 1, wherein:

the anode active material comprises graphite, a silicon oxide-based material, or a mixture thereof.

7. The negative electrode for a secondary battery according to claim 1, wherein:

the conductive material comprises a carbon-based material, CNT (carbon nanotube), graphene, or a mixture thereof.

8. A secondary battery comprising the negative electrode of claim 1.

9. A method for manufacturing a negative electrode for a secondary battery, comprising:

mixing a binder with a first solution to prepare an electrode slurry, wherein the first solution is an aqueous solution including a surfactant, an anode active material, and a conductive material; and applying and coating the electrode slurry onto the electrode current collector, wherein the binder comprises a water-soluble polymer comprising at least one of polyvinylpyrrolidone, polyimide, polyacrylonitrile, or polyamide, wherein the surfactant comprises at least one of t-octylphenoxypolyethoxyethanol, or octylphenoxypolyethoxyethanol, and wherein the electrode slurry has a solid content of 60% by weight to 90% by weight based on the total weight of the electrode slurry.

10. The method for manufacturing the negative electrode for the secondary battery according to claim 9, wherein:

the electrode slurry has a viscosity of 1000 cps to 50000 cps.

11. The method for manufacturing the negative electrode for the secondary battery according to claim 9, wherein:

the surfactant is contained in an amount of 0.01% by weight to 10% by weight based on the total weight of the electrode slurry.

12. The method for manufacturing the negative electrode for the secondary battery according to claim 9, wherein:

the binder has a viscosity of 3000 cps to 50000 cps.

* * * * *